United States Patent
Yang et al.

(10) Patent No.: US 10,701,749 B2
(45) Date of Patent: Jun. 30, 2020

(54) COMMUNICATION METHOD FOR TERMINAL DEVICE IN DEVICE TO DEVICE COMMUNICATION, TERMINAL DEVICE, AND NETWORK DEVICE

(71) Applicant: GUANGDONG OPPO MOBILE TELECOMMUNICATIONS CORP., LTD., Dongguan, Guangdong (CN)

(72) Inventors: Ning Yang, Guangdong (CN); Hai Tang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 55 days.

(21) Appl. No.: 16/304,131

(22) PCT Filed: Sep. 20, 2016

(86) PCT No.: PCT/CN2016/099503
§ 371 (c)(1),
(2) Date: Nov. 22, 2018

(87) PCT Pub. No.: WO2018/053694
PCT Pub. Date: Mar. 29, 2018

(65) Prior Publication Data
US 2020/0163135 A1     May 21, 2020

(51) Int. Cl.
*H04W 76/14*    (2018.01)
*H04W 4/02*     (2018.01)
(Continued)

(52) U.S. Cl.
CPC .......... *H04W 76/14* (2018.02); *H04W 4/023* (2013.01); *H04W 52/36* (2013.01); *H04W 72/02* (2013.01);
(Continued)

(58) Field of Classification Search
CPC ... H04W 72/02; H04W 72/082; H04W 88/02; H04W 8/005; H04W 72/042; H04W 72/10; H04W 76/14
See application file for complete search history.

(56) References Cited

U.S. PATENT DOCUMENTS

2014/0094162 A1* 4/2014 Heo .................. H04W 72/0486
455/422.1
2014/0141789 A1* 5/2014 Tarokh .................. H04W 72/02
455/450
(Continued)

FOREIGN PATENT DOCUMENTS

| CN | 103052164 | 4/2013 |
| CN | 103780530 | 5/2014 |

(Continued)

OTHER PUBLICATIONS

SIPO, Office Action for CN Application No. 201680085531.2, dated Aug. 21, 2019.
(Continued)

*Primary Examiner* — Mewale A Ambaye
(74) *Attorney, Agent, or Firm* — Hodgson Russ LLP

(57) ABSTRACT

Provided in the embodiments of the present disclosure are a communication method for a terminal device in device to device (D2D) communication, a terminal device, and a network device. The method includes: determining, by the first terminal device, information about at least one second terminal device that uses a target resource; and performing, by the first terminal device, the D2D communication according to the information about the at least one second terminal device by using the target resource.

12 Claims, 4 Drawing Sheets

(51) Int. Cl.
*H04W 52/36* (2009.01)
*H04W 72/04* (2009.01)
*H04W 72/02* (2009.01)
*H04W 88/02* (2009.01)
*H04W 72/10* (2009.01)
*H04W 72/08* (2009.01)

(52) U.S. Cl.
CPC ......... *H04W 72/04* (2013.01); *H04W 72/042* (2013.01); *H04W 72/082* (2013.01); *H04W 72/10* (2013.01); *H04W 88/02* (2013.01)

(56) References Cited

U.S. PATENT DOCUMENTS

| | | | |
|---|---|---|---|
| 2015/0305046 | A1 | 10/2015 | Shin et al. |
| 2016/0112172 | A1* | 4/2016 | Seo ........................ H04L 5/0053 370/329 |
| 2016/0302251 | A1* | 10/2016 | Chatterjee ......... H04W 52/0206 |
| 2016/0345337 | A1* | 11/2016 | Seo ........................ H04W 72/02 |
| 2017/0230918 | A1* | 8/2017 | Ryu ........................ H04L 5/003 |
| 2017/0367059 | A1* | 12/2017 | Park .................... H04W 56/001 |
| 2019/0069272 | A1* | 2/2019 | Tang ................ H04W 72/0446 |

FOREIGN PATENT DOCUMENTS

| | | |
|---|---|---|
| CN | 104904289 | 9/2015 |
| CN | 105934986 | 9/2016 |
| CN | 105993201 | 10/2016 |
| EP | 2790456 | 10/2014 |
| EP | 2833675 | 2/2015 |
| EP | 3099126 | 11/2016 |
| WO | 2014079355 | 5/2014 |
| WO | 2015111875 | 7/2015 |
| WO | 2016017099 | 2/2016 |
| WO | 2018053694 | 3/2018 |

OTHER PUBLICATIONS

EPO, Office Action for EP Application No. 16916435, dated Apr. 16, 2019.
WIPO, ISR for PCT/CN2016/099503, dated Jun. 15, 2017.

* cited by examiner

COMMUNICATION METHOD FOR TERMINAL DEVICE IN DEVICE TO DEVICE COMMUNICATION, TERMINAL DEVICE, AND NETWORK DEVICE

CROSS-REFERENCE TO RELATED APPLICATION

This application is a U.S. national phase application of International Application No. PCT/CN2016/099503, filed Sep. 20, 2016, the entire disclosure of which is incorporated herein by reference.

TECHNICAL FIELD

Embodiments of the present disclosure relate to the field of Internet of Things, and more particularly, to a communication method for a terminal device in device to device (D2D), a terminal device, and a network device.

BACKGROUND

In a conventional Long Term Evolution (LTE) communication network, when there is a communication requirement between two mobile terminals, the communication needs to be forwarded by a base station, and at least a two-hop communication link is required. With the increasing communication requirements, a device to device (Device to Device, D2D) communications technology emerges. The D2D technology allows communication nodes in a short distance to directly communicate with each other without using a base station for forwarding, and a two-hop network is thus changed into a one-hop network, thereby solving the problem of shortage of spectrum resources in a wireless communication system to some extent. The D2D technology can be applied to an Internet of Things communication system such as an Internet of Vehicles communication system. However, in the Internet of Vehicles system, mobile access points are relatively dense, the communication distance between vehicles is relatively short, and the number of communication nodes is relatively large. Existing communication schemes cannot make full use of transmission resources, and often lead to a performance loss and a waste of spectrum resources. Therefore, it is urgent to provide a method to solve the problem.

SUMMARY

Embodiments of the present disclosure provide a communication method for a terminal device in device to device (D2D), a terminal device, and a network device, to flexibly allocate communication resources, thereby improving spectrum resource utilization.

According to a first aspect, a communication method for a terminal device in device to device (D2D) is provided. The method includes:

determining, by a first terminal device, information about at least one second terminal device that uses a target resource; and performing, by the first terminal device, D2D communication according to the information about the at least one second terminal device by using the target resource.

Optionally, the information about the at least one second terminal device includes at least one of the following:

information about the target resource used by each second terminal device of the at least one second terminal device, interference capability information of each second terminal device, and location information of each second terminal device.

Optionally, the information about the target resource used by each second terminal device includes resource block occupation information of the target resource used by each second terminal device and information about a maximum transmit power available for each second terminal device to perform transmission by using the target resource; or the interference capability information of each second terminal device includes: maximum interference tolerable by each second terminal device.

In the embodiments of the present disclosure, the "resource block occupation information" may be information about a time-frequency location that the terminal device occupies in a resource block of the target resource, resource block number information, identifier information, and the like. This is not limited herein. In other words, the resource block occupation information is used to indicate a usage status of the resource block of the target resource, and whether to multiplex the resource block may be determined according to the usage status of the resource block. For example, if a resource block having a particular number has already been occupied, the occupied resource block is not used during the selection of the target resource for multiplexing; or if a resource block is not occupied or utilization of a resource block at a certain time-frequency location is relatively low, this resource block may be selected for multiplexing. This is not limited herein.

In the embodiments of the present disclosure, the first terminal device determines the information about the at least one second terminal device that uses the target resource, and performs D2D communication according to the information about the at least one second terminal device by using the target resource, so that communication resources can be flexibly allocated, thereby improving spectrum resource utilization.

In the embodiments of the present disclosure, optionally, the information about the at least one second terminal device includes related information used to represent whether to-be-multiplexed transmission resources of one or more second terminal devices can be multiplexed.

Optionally, in some possible implementations, the at least one terminal device performs D2D communication and/or communicates with a network device by using the target resource.

Optionally, in some possible implementations, for example, the "information about the at least one second terminal device" may include at least one of information such as information about a resource block usage status or a resource block occupation number of the one or more second terminal devices, location information of one or more second terminal devices, a minimum communication requirement signal to interference plus noise ratio (Signal to Interference plus Noise Ratio, SINR) information of one or more second terminal devices, minimum reference signal receiving power (Reference Signal Receiving Power, RSRP) information, and maximum tolerable interference strength information of one or more second terminal devices.

Optionally, in the embodiments of the present disclosure, the target resource is the to-be-multiplexed transmission resource, and may be an uplink transmission resource or a downlink transmission resource of the second terminal device. For example, the transmission resource may be specifically a resource block (Resource Block, RB) or in other forms.

Optionally, in some possible implementations, the first terminal device and the second terminal device may be terminal devices of a same type (for example, both the first terminal device and the second terminal device are vehicle user equipment); or may be terminal devices of different types (for example, the first terminal device is a vehicle user equipment and the second terminal device is a cellular user equipment). This is not limited herein.

Optionally, in some possible implementations, the information about the at least one second terminal device may be delivered by the network device to the first terminal device, or may be obtained by the first terminal device (for example, directly obtained by the first terminal device from the second terminal device).

Optionally, in some possible implementations, after obtaining the information about the at least one second terminal device, the first terminal device may perform, through power control, communication by using the transmission resource of the second terminal device.

Optionally, in some possible implementations, one first terminal device may multiplex transmission resources of a plurality of second terminal devices. Alternatively, a plurality of first terminal devices may multiplex a transmission resource of one second terminal device. In other words, there is no upper limit to the number of the terminal devices that multiplex a same resource block, and there is also no upper limit to the number of the resource blocks that can be multiplexed by one terminal device. This is not limited herein. During actual use, a maximum number of multiplexed resource blocks or a maximum number of multiplexing terminal devices may be set for resource allocation. This is not limited herein.

Optionally, in some possible implementations, before the performing communication by using the transmission resource of the second terminal device, the method may further include:

determining, by the first terminal device, whether the transmission resource of the second terminal device is used by other terminal device.

Before multiplexing the transmission resource of the second terminal device, the first terminal device may first determine whether the transmission resource of the second terminal device is used by other terminal device. Said other terminal device may be the first terminal device or the second terminal device. This is not limited herein. The purpose of the determining step is as follows: user equipment using a same transmission resource may interfere with each other, and severe interference may lead to interruption of communication. To avoid such a possibility of interruption of communication, when the first terminal device multiplexes the transmission resource of the second terminal device, the first terminal device may determine, according to a specific determining result, whether to multiplex the transmission resource of the second terminal device, thereby ensuring that other terminal device using the transmission resource of the second terminal device currently can maintain the communication.

Optionally, in an embodiment, the performing, by the first terminal device, device to device (D2D) communication according to the information about the at least one second terminal device by using the target resource includes:

determining, by the first terminal device, a distance to the second terminal device according to the location information of the second terminal device;

determining, by the first terminal device, a maximum transmit power available for the first terminal device when using the target resource according to the distance to the second terminal device and tolerable interference capability information of the second terminal device; and performing, by the first terminal device, communication according to the maximum transmit power by using the target resource.

Optionally, in some possible implementations, the performing, by the first terminal device, communication according to the maximum transmit power by using the target resource includes:

when the maximum transmit power is greater than a minimum transmit power of the first terminal device that can satisfy a communication requirement, performing, by the first terminal device, D2D communication by using the target resource.

Optionally, in some possible implementations, the performing, by the first terminal device, communication by using the target resource includes:

determining, by the first terminal device, a transmit power P, where the transmit power P satisfies $\min(P_{rest}, P_{max}) > P > P_{min}$, where $P_{max}$ is the maximum transmit power, $P_{min}$ is the minimum transmit power, and $P_{rest}$ is a current remaining transmit power of the first terminal device; and performing, by the first terminal device, D2D communication according to the transmit power P by using the target resource.

Therefore, the first terminal device determines the information about the at least one second terminal device that uses the target resource, and performs D2D communication according to the information about the at least one second terminal device by using the target resource, so that communication resources can be flexibly allocated, thereby improving spectrum resource utilization. Further, the first terminal device can perform, through power control, communication by using the transmission resource of the second terminal device.

Optionally, in an embodiment, when the transmission resource of the second terminal device has already been used by a plurality of second terminal devices or other terminal device, the method further includes:

obtaining, by the first terminal device, interference information of the plurality of second terminal devices, wherein the interference information of the plurality of second terminal devices includes at least one of information used to indicate tolerable interference capabilities of the plurality of terminal devices, information about transmission resources used by the plurality of second terminal devices, and location information of the plurality of second terminal devices; and the performing, by the first terminal device, communication according to the maximum transmit power by using the target resource includes:

when a smallest value in the maximum transmit power and maximum transmit powers of L second terminal devices is greater than the minimum transmit power, performing, by the first terminal device, D2D communication by using the target resource, where the L maximum transmit powers respectively indicate maximum transmit powers available for the first to $L^{th}$ second terminal devices when the target resource is used.

Optionally, in some possible implementations, the performing, by the first terminal device, communication by using the target resource includes:

determining, by the first terminal device, a transmit power P, where the transmit power P satisfies $\min(P_{rest}, P_{max}, P_{max1}, P_{max2}, \ldots, P_{maxL}) > P > P_{min}$, where $P_{max}$ is the maximum transmit power, $P_{min}$ is the minimum transmit power, $L \geq 1$, $P_{max1}, P_{max2}, \ldots, P_{maxL}$ respectively indicate the maximum transmit powers of the first to $L^{th}$ second terminal devices, and $P_{rest}$ is a current remaining transmit power of the first terminal device; and performing, by the first terminal device, D2D communication according to the transmit power P by using the target resource.

Optionally, in some possible implementations, the method further includes:

when $P_{rest} < P_{min}$, stopping, by the first terminal device, using the target resource for communication.

Therefore, the first terminal device determines the information about the at least one second terminal device that uses the target resource, and performs D2D communication according to the information about the at least one second terminal device by using the target resource, so that communication resources can be flexibly allocated, thereby improving spectrum resource utilization. Further, the first terminal device can perform, through power control, communication by using the transmission resource of the second terminal device, while ensuring that other terminal device that uses the transmission resource of the second terminal device can perform communication.

Optionally, in some possible implementations, the method further includes:

after performing D2D communication by using the target resource, updating, by the first terminal device, the current remaining transmit power $P_{rest}$ of the first terminal device according to the transmit power.

Optionally, in some possible implementations, the updating the current remaining transmit power $P_{rest}$ of the first terminal device according to the transmit power includes:

determining, by the first terminal device, the current remaining transmit power of the first terminal device according to the following update formula:

$$P_{rest} = P'_{rest} - P$$

where the update formula indicates that after the first terminal device performs communication by using the target resource, the transmit power P is subtracted from a current remaining transmit power $P'_{rest}$.

Herein, each time after performing communication by using the target resource, the first terminal device may update the current remaining transmit power thereof, to flexibly control whether to use the target resource.

According to a second aspect, a communications method for a terminal device in device to device (D2D) is provided. The method includes:

determining, by a network device, information about at least one second terminal device, where the information about the at least one second terminal device is used by a first terminal device to determine a to-be-used target resource; and sending, by the network device, the information about the at least one second terminal device to the first terminal device.

In the embodiments of the present disclosure, the network device determines the information about the at least one second terminal device, wherein the information about the at least one second terminal device is used by the first terminal device to determine the to-be-used target resource; and sends control information for transmission resource to the first terminal device, so that the first terminal device performs communication according to the information about the at least one second terminal device by using the transmission resource of the second terminal device. Therefore, communication resources can be flexibly allocated, thereby improving spectrum resource utilization.

Optionally, the information about the at least one second terminal device includes at least one of the following:

information about the target resource used by each second terminal device of the at least one second terminal device, interference capability information of each second terminal device, and location information of each second terminal device.

Optionally, the information about the target resource used by each second terminal device includes: resource block occupation information of the target resource used by each second terminal device and information about a maximum transmit power available for each second terminal device to perform transmission by using the target resource; or the interference capability information of each second terminal device includes: maximum interference tolerable by each second terminal device.

Optionally, the determining, by the network device, information about at least one second terminal device includes:

determining, by the network device, tolerable interference capability information of the second terminal device according to the location information of the second terminal device, minimum communication requirement information of the second terminal device, and resource usage information of the second terminal device, where the information about the second terminal device includes the tolerable interference capability information.

According to a third aspect, a terminal device is provided. The terminal device is configured to perform the method according to the first aspect or any possible implementation of the first aspect. Specifically, the apparatus includes units configured to perform the method according to the first aspect or any possible implementation of the first aspect.

According to a fourth aspect, a network device is provided. The network device is configured to perform the method according to the second aspect or any possible implementation of the second aspect. Specifically, the apparatus includes units configured to perform the method according to the second aspect or any possible implementation of the second aspect.

According to a fifth aspect, a terminal device is provided. The terminal device includes a processor, a memory, and a communication interface. The processor and the memory are connected to the communication interface. The memory is configured to store an instruction, the processor is configured to execute the instruction, and the communication interface is configured to communicate with another network element under control of the processor. When the processor executes the instruction stored in the memory, the execution causes the processor to perform the method according to the first aspect or any possible implementation of the first aspect.

According to a sixth aspect, a network device is provided. The terminal device includes a processor, a memory, and a communication interface. The processor and the memory are connected to the communication interface. The memory is configured to store an instruction, the processor is configured to execute the instruction, and the communication interface is configured to communicate with another network element under control of the processor. When the processor executes the instruction stored in the memory, the execution causes the processor to perform the method according to the second aspect or any possible implementation of the second aspect.

According to a seventh aspect, a computer readable storage medium is provided. The computer readable storage medium stores a program, and the program causes a terminal device to perform any communication method for a terminal device in device to device (D2D) according to the first aspect and the implementations of the first aspect.

According to an eighth aspect, a computer readable storage medium is provided. The computer readable storage medium stores a program, and the program causes a network device to perform any communication method for a terminal device in device to device (D2D) according to the second aspect and the implementations of the second aspect.

BRIEF DESCRIPTION OF THE DRAWINGS

To describe the technical solutions in the embodiments of the present disclosure more clearly, the following briefly describes the accompanying drawings required for describing the embodiments or the related art. Apparently, the accompanying drawings in the following descriptions show merely some embodiments of the present disclosure, and a person of ordinary skill in the art may still derive other drawings from these accompanying drawings without creative efforts.

DETAILED DESCRIPTION

Figure 1:
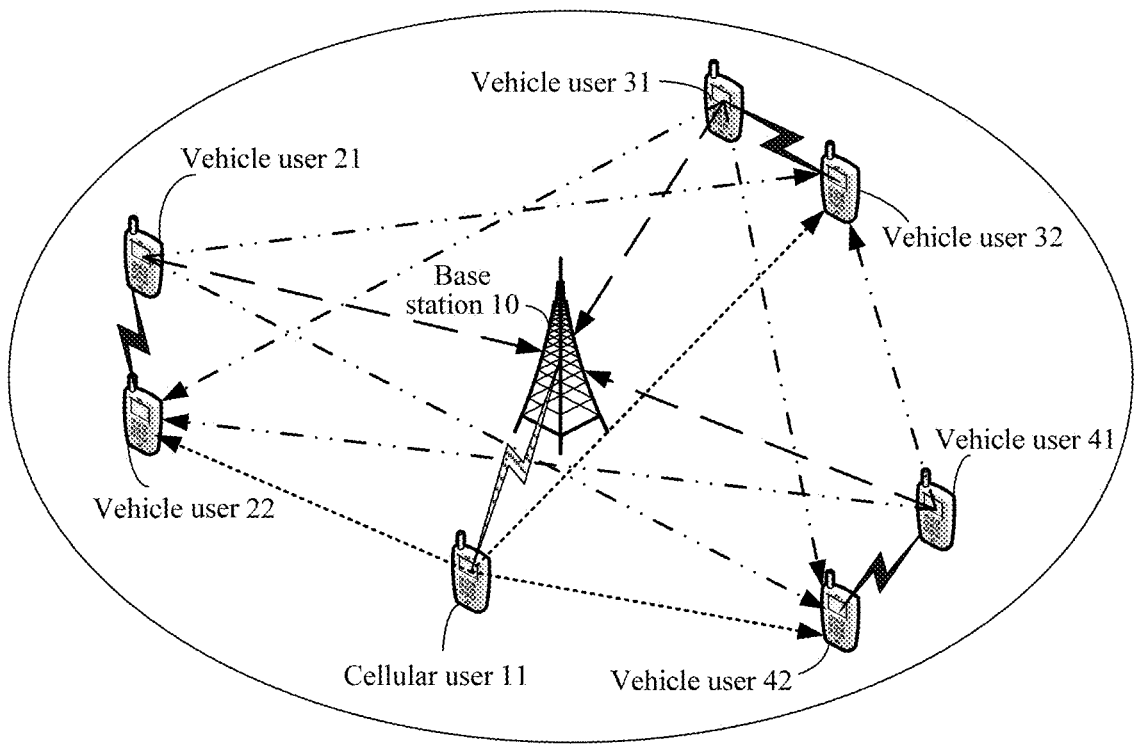
FIG. 1 is a schematic diagram of an application scenario according to an embodiment of the present disclosure.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to a device to device (Device to Device, D2D) communication system, such as an Internet of Things system, a vehicle-mounted network communication system, an Internet of Vehicles system, or a vehicle to vehicle (vehicle to vehicle, V2V) communication system.

It should also be understood that, the technical solutions of the embodiments of the present disclosure may also be applied to various communication systems, for example, a current communication system such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), and particularly may be applied to a future 5G system.

It should also be understood that, in the embodiments of the present disclosure, the network device may also be referred to as a base station, a network side device, or the like. The base station may be a base transceiver station (Base Transceiver Station, BTS) in GSM or CDMA, or a NodeB in WCDMA, or an evolved NodeB (Evolutional Node B, eNB, or eNodeB) in LTE, or a base station device in a future 5G network, or the like. This is not limited in the present disclosure.

It should also be understood that, in the embodiments of the present disclosure, the terminal device may communicate with one or more core networks (Core Network) by using a radio access network (Radio Access Network, RAN). The terminal device may be referred to as an access terminal, a user equipment (User Equipment, UE), a user unit, a user station, a mobile site, a mobile station, a remote station, a remote terminal, a mobile device, a user terminal, a terminal, a wireless communication device, a user agent, or a user apparatus. The terminal device may be a cellular phone, a cordless phone, a Session Initiation Protocol (SIP) phone, a wireless local loop (Wireless Local Loop, WLL) station, a personal digital assistant (Personal Digital Assistant, PDA), a handheld device having a wireless communication function, a computing device, other processing device connected to a wireless modem, a vehicle-mounted device, a wearable device, a terminal device in a future 5G network, or the like. For example, in the embodiments of the present disclosure, the terminal device may include a D2D device, a cellular user equipment (Cellular User Equipment, CUE), a vehicle user equipment (Vehicle User Equipment, VUE), and the like.

FIG. 1 is a schematic diagram of a scenario. It should be understood that, for ease of understanding, the scenario in FIG. 1 is introduced herein for illustration. However, this does not constitute a limitation to the present disclosure. FIG. 1 shows a base station 10, a cellular user equipment 11, a vehicle user equipment 21, a vehicle user equipment 22, a vehicle user equipment 31, a vehicle user equipment 32, a vehicle user equipment 41, and a vehicle user equipment 42. The vehicle user equipment 21 and the vehicle user equipment 22, the vehicle user equipment 31 and the vehicle user equipment 32, and the vehicle user equipment 41 and the vehicle user equipment 42 are respectively three vehicle user equipment pairs in short-distance communication. ━━ indicates a transmission signal of the cellular user equipment 11, ━━ indicates a communication signal between the vehicle user equipment pair, ╌╌╌▶ indicates interference of a communication signal of the cellular user equipment 11 to the communication signal between the vehicle user equipment pair, ━━▶ indicates interference of the communication signal between the vehicle user equipment pair to the communication signal of the cellular user equipment 11, and ━··━·▶ indicates mutual interference between communication signals between the vehicle user equipment pairs.

It should be understood that, the vehicle user equipment pair in FIG. 1 may be a communication pair consisted of vehicles or a communication pair consisted of a vehicle and a device. This is not limited herein.

It should also be understood that, in FIG. 1, one cellular user equipment is used as an example for description. However, there may be a plurality of cellular user equipment. This is not limited herein. Similarly, in FIG. 1, there may be a plurality of vehicle user equipment pairs. The number of the vehicle user equipment pairs is not limited to three shown in the figure. In addition, in an actual application, the vehicle user equipment in the figure may not always in pairs. This is not limited herein.

In the embodiments of the present disclosure, the vehicle user equipment may be a vehicle to X (Vehicle to X, V2X) device, or a D2D communication device. This is not limited herein.

Optionally, the cellular user equipment in FIG. 1 may be a vehicle user equipment. This is not limited herein.

As shown in FIG. 1, the cellular user equipment 11 may communicate with the base station 10, the vehicle user equipment 21 may communicate with the vehicle user equipment 22, the vehicle user equipment 31 may communicate with the vehicle user equipment 32, and the vehicle user equipment 41 may communicate with the vehicle user equipment 42. Herein, when the vehicle user equipment 21 communicates with the vehicle user equipment 22, an uplink resource or downlink resource of the cellular user equipment 11 may be used.

However, in existing Internet of Vehicles communication, the transmission resource of one cellular user equipment can be used by only one vehicle user equipment pair, or one vehicle user equipment pair can use the transmission resource of only one cellular user equipment. As a result, multiplexing of the transmission resource of the cellular user equipment is insufficiently flexible and the resource cannot be fully used, causing a performance loss. Therefore, the terminal device in the present disclosure attempts to flexibly multiplex a transmission resource according to information about at least one second terminal device. For example, if a communications method for a terminal device in device to device (D2D) in the present disclosure is used, the plurality of vehicle user equipment in FIG. 1 may multiplex a resource block (Resource Block, RB) of the cellular user equipment, or a pair of vehicle user equipment may multiplex the resource blocks of a plurality of the cellular user equipment.

Figure 2:
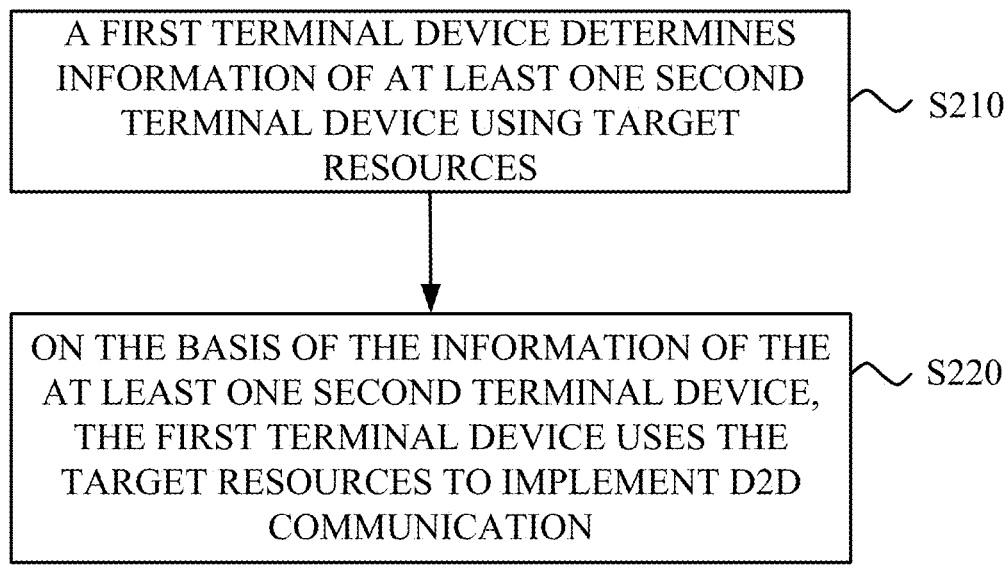
FIG. 2 is a schematic flowchart of a communication method for a terminal device in device to device (D2D) according to an embodiment of the present disclosure.

FIG. 2 is a schematic flowchart of a communication method 200 for a terminal device in device to device (D2D) according to an embodiment of the present disclosure. The method 200 may be performed by a first terminal device, for example, the vehicle user equipment shown in FIG. 1. The vehicle user equipment may be the vehicle user equipment 21, the vehicle user equipment 22, the vehicle user equipment 31, the vehicle user equipment 32, the vehicle user equipment 41, or the vehicle user equipment 42 in FIG. 1. As shown in FIG. 2, the method 200 includes the following steps.

In S210, a first terminal device determines information about at least one second terminal device that uses a target resource.

Optionally, the information about the at least one second terminal device includes at least one of the following:

information about the target resource used by each of the at least one second terminal device, interference capability information of each second terminal device, and location information of each second terminal device.

Optionally, the information about the target resource used by each second terminal device includes resource block occupation information of the target resource used by each second terminal device and information about a maximum transmit power available for each second terminal device to perform transmission by using the target resource; or the interference capability information of each second terminal device includes: a maximum interference tolerable by each second terminal device.

In the embodiments of the present disclosure, the "resource block occupation information" may be information about a time-frequency location that the terminal device occupies in a resource block of the target resource, resource block number information, identifier information, and the like. This is not limited herein. In other words, the resource block occupation information is used to indicate a usage status of the resource block of the target resource, and whether to multiplex the resource block may be determined according to the usage status of the resource block. For example, if a resource block having a particular number has already been occupied, the occupied resource block is not used during the selection of the target resource for multiplexing; or if a resource block is not occupied or utilization of a resource block at a certain time-frequency location is relatively low, the resource block may be selected for multiplexing. This is not limited herein.

In the embodiments of the present disclosure, for example, when the first terminal device has a communication requirement, the first terminal device may attempt to multiplex a transmission resource of a certain terminal device. When attempting to multiplex a to-be-multiplexed transmission resource (that is, the target resource) of the second terminal device, it is needed to obtain or determine the information about the second terminal device at first, so as to determine whether the transmission resource of the second terminal device can be multiplexed.

In the embodiments of the present disclosure, the information about the at least one second terminal device includes related information used to represent whether one or more second terminal devices can be multiplexed.

In the embodiments of the present disclosure, the "target resource" indicates a transmission resource of the at least one second terminal device that the first terminal device needs to multiplex or use. Optionally, in the embodiments of the present disclosure, the "target resource" may be an uplink transmission resource or a downlink transmission resource of the second terminal device. For example, the transmission resource may be specifically an RB or in other forms.

Optionally, for example, the "information about the at least one second terminal device" may include at least one of information such as information about a resource block usage status or a resource block occupation information of the one or more second terminal devices, location information of the one or more second terminal devices, a minimum communication requirement signal to interference plus noise ratio (Signal to Interference plus Noise Ratio, SINR) information of the one or more second terminal devices, minimum reference signal receiving power (Reference Signal Receiving Power, RSRP) information, and maximum tolerable interference strength information of the one or more second terminal devices.

It should be noted that, in the embodiments of the present disclosure, the second terminal device may be the cellular user equipment in FIG. 1. Alternatively, the second terminal device may be the vehicle user equipment in FIG. 1. In other words, the vehicle user equipment may multiplex an uplink resource or a downlink resource of the cellular user equipment, or may multiplex communication resources of other vehicle user equipment pair. This is not limited herein.

Optionally, the information about the at least one second terminal device may be delivered by a network device to the first terminal device. For example, in FIG. 1, if there are a plurality of cellular user equipment 11 (FIG. 1 does not show a plurality of cellular user equipment 11), the base station 10 learns of location information, minimum communication requirement SINR information, resource block occupation information, and the like of the plurality of cellular user equipment 11. The base station 10 may calculate a maximum tolerable interference strength of each cellular user equipment 11 according to a signal strength and a minimum communication requirement SINR of individual cellular user equipment 11, and then deliver, through broadcasting, a plurality of pieces of information of the cellular user equipment that are learned of and/or calculated by the base station 10 to a vehicle user equipment having a communication requirement, to help this vehicle user equipment to select a transmission resource of the cellular user equipment for multiplexing.

Optionally, the information about the at least one second terminal device may also be obtained by the first terminal device (for example, the first terminal device directly obtains it from the second terminal device). This is not limited herein.

It should be understood that, introduction of the "first terminal device" and the "second terminal device" is merely for ease of description, and does not constitute a specific limitation to the present disclosure.

It should also be understood that, in the embodiments of the present disclosure, the first terminal device and the second terminal device may be terminal devices of a same type (for example, both the first terminal device and the second terminal device are vehicle user equipment); or may be terminal devices of different types (for example, the first terminal device is a vehicle user equipment, and the second terminal device is a cellular user equipment). This is not limited herein.

In S220, the first terminal device performs communication according to the information about the at least one second terminal device by using the target resource.

Specifically, after obtaining the information about the at least one second terminal device, the first terminal device may (determine to) use the target resource (such as transmission resources of the one or more second terminal devices) for communication according to the obtained information about the at least one second terminal device.

Optionally, after obtaining the information about the at least one second terminal device, the first terminal device may perform, through power control, communication by using the transmission resource of the second terminal device.

For example, after obtaining the location information and tolerable interference information of the second terminal device, the first terminal device may learn of a distance between the first terminal device and the second terminal device according to the location information, and then calculate a maximum transmit power of the first terminal device according to the distance and the tolerable interference information. In addition, the first terminal device may calculate a minimum transmit power of the first terminal device according to a minimum communication requirement (such as an SINR value and/or an RSRP) of the first terminal device. Finally, the first terminal device selects an appropriate power with reference to the maximum transmit power and the minimum transmit power, and performs communication according to the appropriate power by using the transmission resource of the second terminal device.

It should be understood that, in the embodiments of the present disclosure, one first terminal device may multiplex transmission resources of a plurality of second terminal devices. Alternatively, a plurality of first terminal devices may multiplex a transmission resource of one second terminal device. In other words, there is no upper limit to the number of terminal devices that multiplex a same resource block, and there is also no upper limit to the number of resource blocks that can be multiplexed by one terminal device. This is not limited herein. During actual use, a maximum number of multiplexed resource blocks or a maximum number of multiplexing terminal devices may be set for resource allocation. This is not limited herein.

In the embodiments of the present disclosure, the first terminal device determines the information about the at least one second terminal device that uses the target resource, and performs D2D communication according to the information about the at least one second terminal device by using the target resource, so that the communication resources can be flexibly allocated, thereby improving spectrum resource utilization.

Optionally, in some possible implementations, the at least one terminal device performs D2D communication and/or communicates with a network device by using the target resource.

Optionally, before performing communication by using the transmission resource of the second terminal device, the method 200 may further include:

determining, by the first terminal device, whether the transmission resource of the second terminal device is used by other terminal device.

Specifically, before multiplexing the transmission resource of the second terminal device, the first terminal device may first determine whether the transmission resource of the second terminal device is used by other terminal device. The other terminal device may be the first terminal device or the second terminal device. This is not limited herein. The purpose of the determining step is as follows: the user equipment using a same transmission resource may interfere with each other, and severe interference may lead to an interruption of communication. To avoid such a possibility of interruption of communication, when the first terminal device multiplexes the transmission resource of the second terminal device, the first terminal device may determine, according to a specific determining result, whether to multiplex the transmission resource of the second terminal device, thereby ensuring that other terminal device using the transmission resource of the second terminal device can maintain communication.

Two cases of whether the second terminal device is multiplexed by other terminal device are described below by using examples.

Optionally, in an embodiment, when the transmission resource of the second terminal device is used by only one second terminal device, the performing, by the first terminal device, device to device (D2D) communication according to the information about the at least one second terminal device by using the target resource includes:

determining, by the first terminal device, a distance to the second terminal device according to the location information of the second terminal device;

determining, by the first terminal device, a maximum transmit power available for the first terminal device when using the target resource according to the distance to the second terminal device and tolerable interference capability information of the second terminal device; and performing, by the first terminal device, communication according to the maximum transmit power by using the target resource.

Specifically, when the first terminal device determines that the transmission resource of the second terminal device is used by only one second terminal device and is not multiplexed by other terminal device, the first terminal device may calculate the distance to the second terminal device according to the location information of the second terminal device. Then, the first terminal device determines, according to the distance to the second terminal device, the tolerable interference capability information of each second terminal device, and the like, the maximum transmit power when the second terminal device is multiplexed (if a transmit power of the first terminal device is higher than the maximum transmit power, interference is relatively high, which may affect communication of the second terminal device). Finally, the first terminal device performs communication according to the maximum transmit power by using the target resource. In this way, when the first terminal device performs communication by using the target resource, communication of the second terminal device is not affected.

Optionally, the performing, by the first terminal device, communication according to the maximum transmit power by using the target resource includes:

when the maximum transmit power is greater than a minimum transmit power of the first terminal device that can satisfy a communication requirement, performing, by the first terminal device, D2D communication by using the target resource.

Specifically, when the maximum transmit power of the first terminal device can satisfy the communication requirement of the first terminal device (that is, the communication of the first terminal device can be ensured), the first terminal device performs D2D communication by using the target resource.

Optionally, the performing, by the first terminal device, communication by using the target resource includes:

determining, by the first terminal device, a transmit power P, where the transmit power P satisfies $\min(P_{rest}, P_{max})>P>P_{min}$, where $P_{max}$ is the maximum transmit power, $P_{min}$ is the minimum transmit power, and $P_{rest}$ is a current remaining transmit power of the first terminal device; and performing, by the first terminal device, D2D communication according to the transmit power P by using the target resource.

Specifically, the first terminal device may determine the transmit power P. The first terminal device may perform communication according to P by using the target resource, provided that P satisfies a preset condition. For example, the transmit power P satisfies the preset condition $\min(P_{rest}, P_{max})>P>P_{min}$, where $P_{max}$ is the maximum transmit power, $P_{rest}$ is the current remaining transmit power of the first terminal device, and $P_{min}$ is the minimum transmit power. In addition, the remaining transmit power of the first terminal device satisfies $P_{rest}>P_{min}$.

Optionally, the method further includes:

after performing D2D communication by using the target resource, updating, by the first terminal device, the current remaining transmit power $P_{rest}$ of the first terminal device according to the transmit power.

Optionally, the updating the current remaining transmit power $P_{rest}$ of the first terminal device according to the transmit power includes:

determining, by the first terminal device, the current remaining transmit power of the first terminal device according to the following update formula:

$$P_{rest}=P'_{rest}-P$$

where the update formula indicates that after the first terminal device performs communication by using the target resource, the transmit power P is subtracted from a current remaining transmit power $P'_{rest}$.

Specifically, when the first terminal device does not perform communication, an initial maximum transmit power of the first terminal device is $P_0$ (if the first terminal device does not multiplex any transmission resource, the remaining transmit power $P_{rest}=P_0$). First, the first terminal device may calculate the minimum transmit power $P_{min}$ according to the minimum communication requirement SINR of itself (if the transmit power is less than the minimum transmit power $P_{min}$, communication of the first terminal device cannot be ensured). Then, after the first terminal device obtains the information indicating a tolerable interference capability of the second terminal device, the first terminal device calculates the maximum transmit power $P_{max}$ of the first terminal device with reference to the distance between the first terminal device and the second terminal device (if the transmit power is higher than the maximum transmit power $P_{max}$, interference of the first terminal device on the second terminal device is excessively high, which may affect communication of the second terminal device). Finally, the first terminal device determines whether the remaining transmit power $P_{rest}$ of the first terminal device satisfies a condition (for example, $P_{rest}>P_{min}$). If the condition $P_{rest}>P_{min}$ is satisfied, the first terminal device selects the transmit power P as a transmit power for multiplexing the transmission resource of the second terminal device. In addition, the transmit power P needs to satisfy the preset condition $\min(P_{rest}, P_{max})>P>P_{min}$. Moreover, each time the first terminal device completes communication by using the transmission resource of the second terminal device, the first terminal device needs to update the current remaining transmit power $P_{rest}$ of the first terminal device. An update manner may be $P_{rest}=P_{rest}-P$.

Herein, when $P_{rest}<P_{min}$, the first terminal device gives up multiplexing the transmission resource of the second terminal device.

Optionally, the first terminal device may continue to detect a transmission resource usage status of other terminal device, and the foregoing steps are repeated.

Therefore, the first terminal device determines the information about the at least one second terminal device that uses the target resource, and performs D2D communication according to the information about the at least one second terminal device by using the target resource, so that communication resources can be flexibly allocated, thereby improving spectrum resource utilization. Further, the first terminal device can perform, through power control, communication by using the transmission resource of the second terminal device.

Optionally, in an embodiment, for example, a case in which the transmission resource of the second terminal device has already been used by a plurality of second terminal devices (or other terminal device) is also applicable to this embodiment of the present disclosure. This case is similar to the case in which the transmission resource of the second terminal device is used by only the second terminal device. For brevity, for some similar operations that need to be performed, details are not described herein again. Optionally, the method may further include:

obtaining, by the first terminal device, information about L second terminal devices, where the information about other terminal devices includes at least one of information used to indicate tolerable interference capabilities of the L second terminal devices, information about transmission resources used by the L second terminal devices, and location information of the L second terminal devices.

For example, in the embodiments of the present disclosure, when the first terminal device determines that the transmission resource of the second terminal device is not only used by the second terminal device but also occupied by other terminal device (such as the plurality of vehicle user equipment pairs in FIG. 1), for example, L second terminal devices, the first terminal device further needs to consider some factors of the other terminal device (for example, interference information of the other terminal device) when determining the transmit power. The first terminal device may obtain the interference information of the other terminal device (such as information about a tolerable interference capability, occupied resource block information, location information, and signal strength information of the other terminal device). Then, the first terminal device determines the transmit power according to information indicating a tolerable interference capability of the second terminal device, transmission resource usage status information of the second terminal device, the interference information of the other terminal device, and the like. Similarly, the first terminal device needs to update a remaining transmit power of the first terminal device, and performs communication by using the transmission resource of the second terminal device when a relationship between the transmit power and the current remaining transmit power of the first terminal device satisfies a preset condition. It should be understood that the other terminal device may be a first terminal device or a second terminal device. This is not limited herein.

In the embodiments of the present disclosure, the terminal devices (such as L second terminal devices) that have occupied some resource blocks may calculate their tolerable interference strengths according to their communication signal strengths, received signal interference strengths, and minimum communication requirement SINRs. In addition, optionally, the first terminal device may further receive interference information (such as tolerable interference capability information, occupied resource block information, location information, and signal strength information) broadcast or notified by other terminal device (that is, the terminal devices that have occupied some resource blocks) to the first terminal device.

In the embodiments of the present disclosure, optionally, when the target resource is used by the L second terminal devices, the performing, by the first terminal device, communication according to the maximum transmit power by using the target resource includes:

when a smallest value in the maximum transmit power and maximum transmit powers of the L second terminal devices (when the maximum transmit power and the smallest value of the maximum transmit powers of the L second terminal devices) is greater than the minimum transmit power, performing, by the first terminal device, D2D communication by using the target resource, where the L maximum transmit powers respectively indicate maximum transmit powers available for the first to $L^{th}$ second terminal devices when the target resource is used.

Optionally, the performing, by the first terminal device, communication by using the target resource includes:

determining, by the first terminal device, a transmit power P, where the transmit power P satisfies min($P_{rest}$, $P_{max}$, $P_{max1}$, $P_{max2}$, . . . , $P_{maxL}$)>P>$P_{min}$, where $P_{max}$ is the maximum transmit power, $P_{min}$ is the minimum transmit power, L≥1, $P_{max1}$, $P_{max2}$, . . . , $P_{maxL}$ respectively indicate the maximum transmit powers of the first to $L^{th}$ second terminal devices, and $P_{rest}$ is a current remaining transmit power of the first terminal device; and performing, by the first terminal device, D2D communication according to the transmit power P by using the target resource.

Specifically, a manner of selecting the transmit power P of the first terminal device by the first terminal device in the case in which the transmission resource of the second terminal device is occupied by the L second terminal devices is similar to that in the foregoing described case in which the transmission resource of the second terminal device is occupied by only the second terminal device. A difference lies in that in this case, for the preset condition that the transmit power P satisfies, impact of communication of the L second terminal devices on the first terminal device needs to be further considered. For example, an affecting condition of the maximum transmit powers of the L second terminal devices need to be added to the preset condition min($P_{rest}$, $P_{max}$, $P_{max1}$, $P_{max2}$, . . . , $P_{maxL}$)>P>$P_{min}$, where $P_{max1}$, $P_{max2}$, . . . , $P_{maxL}$ respectively indicate the maximum transmit powers of the first to $L^{th}$ second terminal devices when the target resource is used, and L indicates the number of the L second terminal devices.

It should be understood that, for brevity, some term concepts or similar steps are not described herein again.

Therefore, the first terminal device determines the information about the at least one second terminal device that uses the target resource, and performs D2D communication according to the information about the at least one second terminal device by using the target resource, so that communication resources can be flexibly allocated, thereby improving spectrum resource utilization. Further, the first terminal device can perform, through power control, communication by using the transmission resource of the second terminal device, while ensuring that other terminal device that uses the transmission resource of the second terminal device can perform communication.

Figure 3:
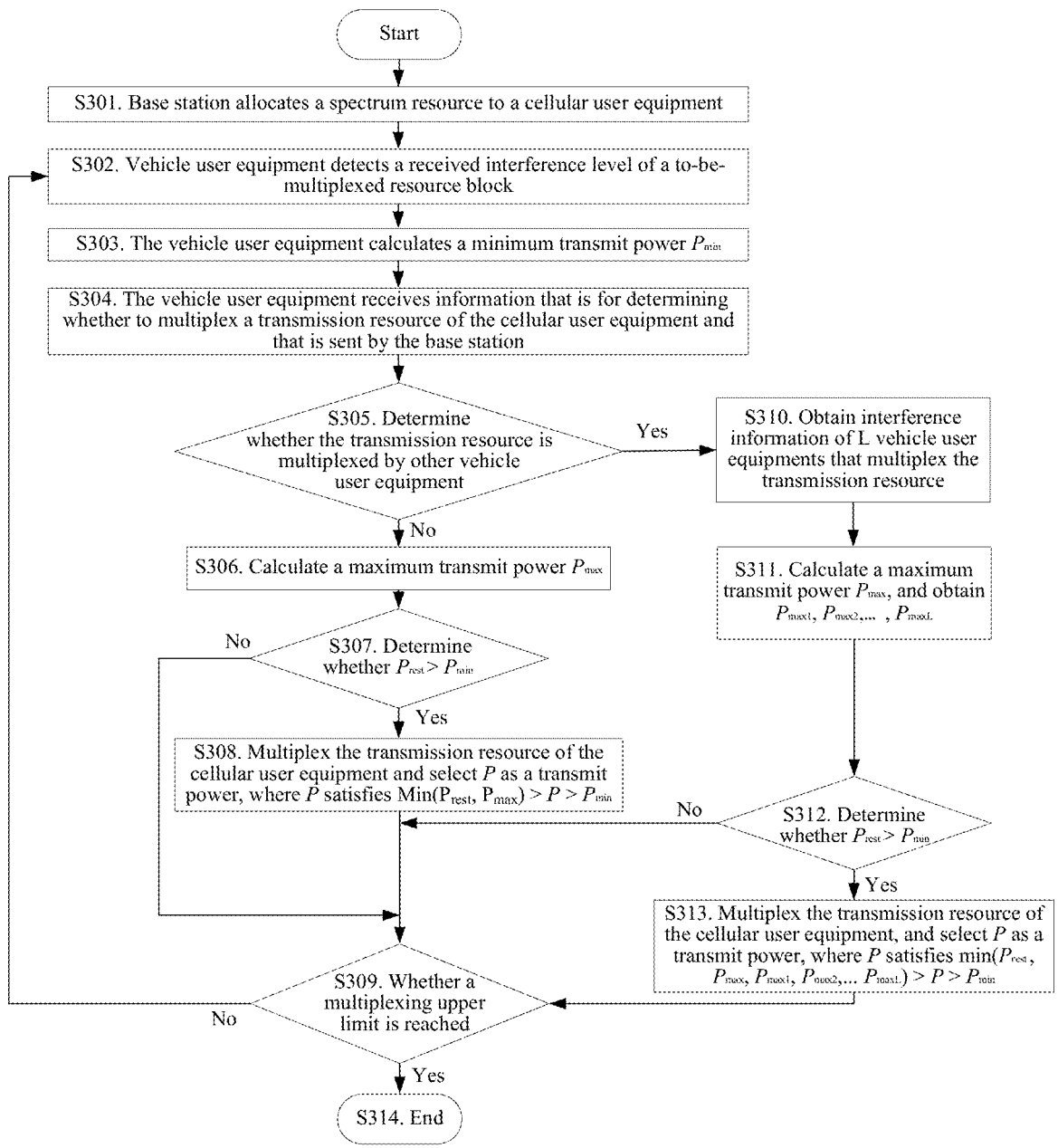
FIG. 3 is a schematic diagram of an example of communication of a terminal device in device to device (D2D) according to an embodiment of the present disclosure.

An embodiment of the present disclosure is described below with reference to FIG. 3. FIG. 3 is a schematic diagram of an example of a communication method for a terminal device in device to device according to an embodiment of the present disclosure. It should be understood that, FIG. 3 is introduced to help a person skilled in the art to understand the embodiments of the present disclosure, and does not constitute a limitation to the present disclosure. As shown in FIG. 3, the method includes the following steps.

In S301, a base station allocates a spectrum resource to a cellular user equipment.

The base station learns of location information of all cellular user equipment, and may allocate a spectrum resource to each cellular user equipment. The spectrum resources used between individual cellular user equipment are orthogonal and independent, that is, the spectrum resources between individual cellular user equipment do not interfere with each other. For example, it is assumed that a system has N CUE users, and the N CUE users respectively occupy N independent and orthogonal resource blocks RBs. Herein, descriptions are made by using a cellular user equipment as an example.

In S302, a vehicle user equipment detects a received interference level of a to-be-multiplexed resource block.

When the vehicle user equipment has a communication requirement, the vehicle user equipment may attempt to multiplex a transmission resource of a certain cellular user equipment. When attempting to multiplex a resource block, the vehicle user equipment may first detect a received interference level of the cellular user equipment, to determine whether the resource block can be multiplexed. Optionally, the interference level of the cellular user equipment may be delivered by the base station through broadcasting.

In S303, the vehicle user equipment calculates a minimum transmit power $P_{min}$.

The vehicle user equipment may calculate the minimum transmit power $P_{min}$ according to a requirement such as a minimum communication requirement SINR or RSRP. $P_{min}$ indicates that when a transmit power is lower than the minimum transmit power $P_{min}$, communication of the vehicle user equipment cannot be ensured.

In S304, the vehicle user equipment receives information about at least one cellular user equipment that is sent by the base station.

Optionally, the information about the at least one cellular user equipment includes location information of each cellular user equipment, resource block occupation information of each cellular user equipment, minimum communication requirement SINR information of each cellular user equipment, maximum tolerable interference strength information of each cellular user equipment, and the like.

Optionally, the base station may calculate a maximum tolerable interference strength of each cellular user equipment according to a received signal strength and the minimum communication requirement SINR information of each cellular user equipment.

Optionally, the vehicle user equipment may receive information about each cellular user equipment that is sent by the base station through broadcasting.

In S305, the vehicle user equipment determines whether a transmission resource is multiplexed by other vehicle user equipment.

When attempting to multiplex the transmission resource of the cellular vehicle user equipment, the vehicle user equipment may first determine whether the transmission resource is occupied by other user equipment, and then determine, according to an actual situation, whether to join in a set of user equipment (or referred to as a resource cluster) that multiplex the transmission resource.

Optionally, when the vehicle user equipment determines that the transmission resource of the cellular user equipment is used by only the cellular user equipment (the transmission resource is not multiplexed by any vehicle user equipment), S306 of calculating, by the vehicle user equipment, a maximum transmit power $P_{max}$ is performed.

The vehicle user equipment may calculate a distance between the vehicle user equipment and the cellular user equipment according to the location information of the cellular user equipment, and then calculate the maximum transmit power $P_{max}$ with reference to the received maximum tolerable interference strength of the cellular user equipment. $P_{max}$ indicates that when the transmit power is higher than the maximum transmit power $P_{max}$, communication of the cellular user equipment is affected.

In S307, the vehicle user equipment determines whether $P_{rest}>P_{min}$ is satisfied.

$P_{rest}$ is a remaining transmit power of the vehicle user equipment, and an initial value of $P_{rest}$ is $P_0$ (that is, an initial power when no communication is performed).

Optionally, when $P_{rest}>P_{min}$, S308 of multiplexing the transmission resource of the cellular user equipment and selecting P as a transmit (sending) power used by the vehicle user equipment during communication is performed, where P satisfies a preset condition $\min(P_{rest}, P_{max})>P>P_{min}$.

Herein, the vehicle user equipment updates the remaining transmit power $P_{rest}$ during each communication. An update manner may be $P_{rest}=P_{rest}-P$.

Optionally, if a multiplexing upper limit is reached in S309, S314 of ending the process is performed.

If $P_{rest}<P_{min}$, it indicates that the multiplexing upper limit is reached, then multiplexing the transmission resource of the cellular user equipment is given up; and if $P_{rest}>P_{min}$, S302 to S309 are repeatedly performed to detect other transmission resources.

Optionally, when it is determined that the transmission resource of the cellular user equipment is used by the cellular user equipment and is multiplexed by L vehicle user equipment, S310 of obtaining, by the vehicle user equipment, interference information of L vehicle user equipment that multiplex the transmission resource is performed.

Specifically, the vehicle user equipment may receive the interference information sent by the L vehicle user equipment, for example, tolerable interference strengths, location information, occupied resource block numbers and other information of the L user equipment.

In S311, a maximum transmit power $P_{max}$ is calculated, and maximum transmit powers $P_{max1}, P_{max2}, \ldots, P_{maxL}$ of the L vehicle user equipment are obtained.

The vehicle user equipment calculates the maximum transmit power $P_{max}$ of the L vehicle user equipment according to the location information and the tolerable interference strengths of the L vehicle user equipment, and obtains the maximum transmit powers $P_{max1}, P_{max2}, \ldots, P_{maxL}$ of the L vehicle user equipment. Herein, $P_{max}$ indicates that when the transmit power is higher than the maximum transmit power $P_{max}$, communication of the L vehicle user equipment may be affected. $P_{max1}, P_{max2}, \ldots, P_{maxL}$ respectively indicate the maximum transmit powers of the first to an $L^{th}$ terminal device, and L indicates the number of vehicle user equipment that multiplex the transmission resource of the cellular user equipment.

In S312, the vehicle user equipment determines whether $P_{rest}>P_{min}$ is satisfied.

Similar to S307, in this case, the vehicle user equipment also needs to determine whether a remaining transmit power of the vehicle user equipment satisfies the condition, and details are not described herein again.

In S313, the vehicle user equipment multiplexes the transmission resource of the cellular user equipment, and selects P as a transmit power, where P satisfies a preset condition $\min(P_{rest}, P_{max}, P_{max1}, P_{max2}, \ldots, P_{maxL})>P>P_{min}$.

Optionally, if a multiplexing upper limit is reached in S309, S314 of ending the process is performed.

Specifically, if $P_{rest}<P_{min}$, it indicates that the multiplexing upper limit is reached, then multiplexing the transmission resource of the cellular user equipment is given up; and if $P_{rest}>P_{min}$, S302 is performed.

Therefore, in the foregoing example, the vehicle user equipment can fully use the transmission resource of the cellular user equipment through power control, thereby improving the spectral efficiency and communication capacity to a great extent and reducing mutual interference between the user equipment that multiplex the transmission resource. Further, the vehicle user equipment undertakes some calculation and determining actions, thereby reducing burdens of the base station.

It should be understood that sequence numbers of the foregoing processes do not mean execution sequences in the embodiments of the present disclosure. The execution sequences of the processes should be determined according to functions and internal logic of the processes, and should not be construed as any limitation to the implementation processes of the embodiments of the present disclosure.

The foregoing describes the communication method for a terminal device in device to device (D2D) according to the embodiments of the present disclosure from the perspective of a terminal device, and the following describes a communication method for a terminal device in device to device (D2D) according to an embodiment of the present disclosure from the perspective of a network device.

Figure 4:
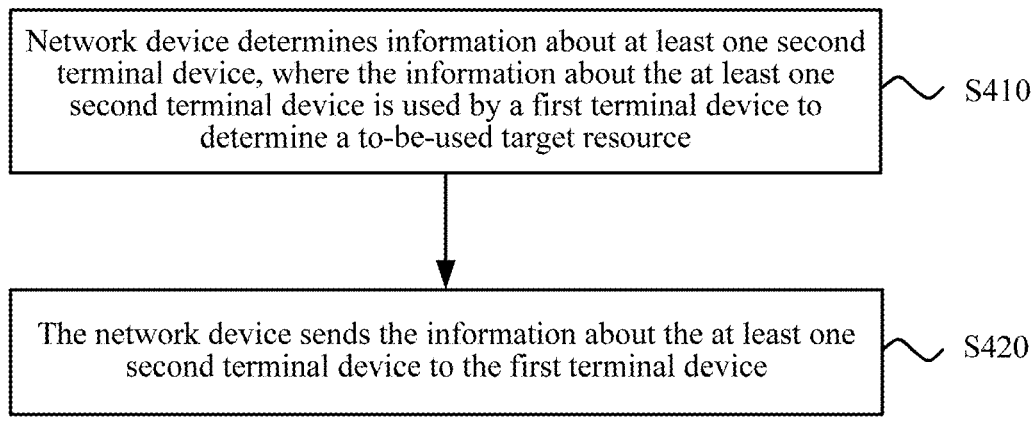
FIG. 4 is a schematic flowchart of a communications method for a terminal device in device to device (D2D) according to another embodiment of the present disclosure.

FIG. 4 shows a communication method 400 for a terminal device in device to device (D2D) according to another embodiment of the present disclosure. The method is performed by a network device. It should be understood that, some related concepts or terms in this embodiment are already described in detail from the perspective of the terminal device. For brevity, details are not described from the perspective of the network device. As shown in FIG. 4, the method 400 includes the following steps.

In S410, the network device determines information about at least one second terminal device, where the information about the at least one second terminal device is used by a first terminal device to determine a to-be-used target resource.

In S420, the network device sends the information about the at least one second terminal device to the first terminal device.

Optionally, the information about the at least one second terminal device includes at least one of the following:

information about the target resource used by each of the at least one second terminal device, interference capability information of each second terminal device, and location information of each second terminal device.

Optionally, the information about the target resource used by each second terminal device includes resource block occupation information of the target resource used by each second terminal device and information about a maximum transmit power available for each second terminal device to perform transmission by using the target resource; or the interference capability information of each second terminal device includes: maximum interference tolerable by each second terminal device.

In this embodiment of the present disclosure, the network device determines the information about the at least one second terminal device, where the information about the at least one second terminal device is used by the first terminal device to determine the to-be-used target resource; and sends control information for transmission resource to the first terminal device, so that the first terminal device performs communication according to the information about the at least one second terminal device by using the transmission resource of the second terminal device. Therefore, communication resources can be flexibly allocated, thereby improving spectrum resource utilization.

Optionally, the determining, by the network device, information about at least one second terminal device includes:

determining, by the network device, tolerable interference capability information of the second terminal device according to the location information of the second terminal device, minimum communication requirement information of the second terminal device, and resource usage information of the second terminal device, where the information about the second terminal device includes the tolerable interference capability information.

Specifically, the network device learns of information related to each second terminal device. The related information includes location information, communication requirement information (such as an SINR value and an RSRP value), resource block information (such as a resource block number), signal strength information, and the like. The network device may calculate a maximum tolerable interference strength of each second terminal device according to the information, and send the calculated maximum tolerable interference strength to the first terminal device.

Therefore, the network device determines the information about the at least one second terminal device, where the information about the at least one second terminal device is used by the first terminal device to determine the to-be-used target resource; and sends control information for transmission resource to the first terminal device, so that the first terminal device performs communication according to the information about the at least one second terminal device by using the transmission resource of the second terminal device. Therefore, communication resources can be flexibly allocated, thereby improving spectrum resource utilization.

The foregoing describes the communication method for a terminal device in device to device (D2D) according to the embodiments of the present disclosure in detail, and the following describes a terminal device according to an embodiment of the present disclosure.

Figure 5:
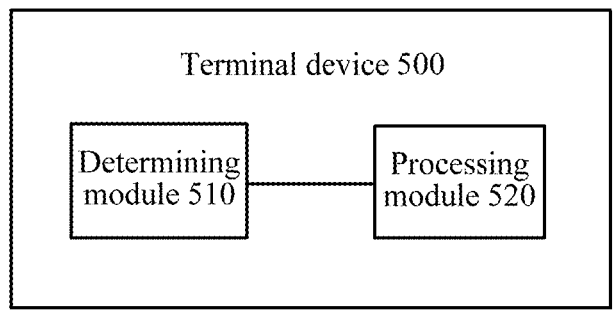
FIG. 5 is a schematic block diagram of a terminal device according to an embodiment of the present disclosure.

FIG. 5 is a schematic block diagram of a terminal device 500 according to an embodiment of the present disclosure. As shown in FIG. 5, the terminal device 500 includes: a determining module 510 and a processing module 520.

The determining module 510 is configured to determine information about at least one second terminal device that uses a target resource.

The processing module 520 is configured to perform, according to the information about the at least one second terminal device that is determined by the determining module 510, D2D communication by using the target resource.

Optionally, the information about the at least one second terminal device includes at least one of the following:

information about the target resource used by each of the at least one second terminal device, interference capability information of each second terminal device, and location information of each second terminal device.

Optionally, the information about the target resource used by each second terminal device includes resource block occupation information of the target resource used by each second terminal device and information about a maximum transmit power available for each second terminal device to perform transmission by using the target resource; or the interference capability information of each second terminal device includes: maximum interference tolerable by each second terminal device.

In this embodiment of the present disclosure, the first terminal device 500 determines the information about the at least one second terminal device that uses the target resource, and performs D2D communication according to the information about the at least one second terminal device by using the target resource, so that communication resources can be flexibly allocated, thereby improving spectrum resource utilization.

It should be noted that, the terminal device 500 may represent the first terminal device in the foregoing method embodiments.

Optionally, in an embodiment, the terminal device 500 further includes:

a determining module, configured to determine whether a transmission resource of the second terminal device is used by another terminal device.

Optionally, in an embodiment, the processing module 520 is specifically configured to:

determine a distance to the second terminal device according to the location information of the second terminal device;

determine, according to the distance to the second terminal device and tolerable interference capability information of the second terminal device, a maximum transmit power available for the first terminal device when using the target resource; and perform communication according to the maximum transmit power by using the target resource.

Optionally, the processing module 520 is specifically configured to:

when the maximum transmit power is greater than a minimum transmit power of the terminal device that can satisfy a communication requirement, perform, by the terminal device, D2D communication by using the target resource.

Optionally, the processing module 520 is specifically configured to:

determine a transmit power P, where the transmit power P satisfies $\min(P_{rest}, P_{max}) > P > P_{min}$, where $P_{max}$ is the maximum transmit power, $P_{min}$ is the minimum transmit power, and $P_{rest}$ is a current remaining transmit power of the terminal device; and perform D2D communication according to the transmit power P by using the target resource.

Optionally, the processing module 520 is further configured to:

when a smallest value in the maximum transmit power and maximum transmit powers of L second terminal devices is greater than the minimum transmit power, perform, by the first terminal device, D2D communication by using the target resource, where the target resource is used by the L second terminal devices, and the L maximum transmit powers respectively indicate maximum transmit powers available for the first to $L^{th}$ second terminal devices when the target resource is used.

Optionally, the processing module 520 is specifically configured to:

determine a transmit power P, where the transmit power P satisfies $\min(P_{rest}, P_{max}, P_{max1}, P_{max2}, \ldots, P_{maxL}) > P > P_{min}$, where $P_{max}$ is the maximum transmit power, $P_{min}$ is the minimum transmit power, $L \geq 1$, $P_{max1}, P_{max2}, \ldots, P_{maxL}$ respectively indicate the maximum transmit powers of the first to $L^{th}$ second terminal devices, and $P_{rest}$ is a current remaining transmit power of the terminal device; and perform D2D communication according to the transmit power P by using the target resource.

Optionally, the terminal device 500 further includes:

an update module, configured to, after D2D communication is performed by using the target resource, update the current remaining transmit power $P_{rest}$ of the terminal device according to the transmit power.

Optionally, the update module is specifically configured to:

determine the current remaining transmit power of the first terminal device according to the following update formula:

$$P_{rest} = P'_{rest} - P$$

where the update formula indicates that after the terminal device performs communication by using the target resource, the transmit power P is subtracted from a current remaining transmit power $P'_{rest}$.

Optionally, the processing module 520 is further configured to:

when $P_{rest} < P_{min}$, stop, by the first terminal device, using the target resource for communication.

Optionally, the determining module 510 is specifically configured to:

receive the information about the at least one second terminal device that is sent by a network device; or receive the information about the at least one second terminal device that is sent by the at least one second terminal device.

Optionally, the at least one terminal device performs D2D communication and/or communicates with a network device by using the target resource.

The terminal device 500 according to this embodiment of the present disclosure may perform the communications method 200 for a terminal device in device to device (D2D) according to the embodiments of the present disclosure and various embodiments thereof, and the foregoing and other operations and/or functions of the modules in the apparatus 500 respectively implement corresponding procedures of the foregoing methods. For brevity, details are not described herein again.

Therefore, the terminal device 500 according to this embodiment of the present disclosure determines the information about the at least one second terminal device that uses the target resource, and performs D2D communication according to the information about the at least one second terminal device by using the target resource, so that communication resources can be flexibly allocated, thereby improving spectrum resource utilization. Further, the first terminal device can perform, through power control, communication by using the transmission resource of the second terminal device, while ensuring that other terminal device that uses the transmission resource of the second terminal device can perform communication.

The foregoing describes the terminal device according to the embodiments of the present disclosure in detail, and the following describes a network device according to an embodiment of the present disclosure.

Figure 6:
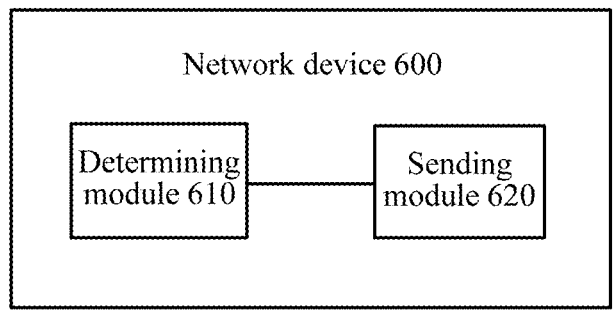
FIG. 6 is a schematic block diagram of a network device according to an embodiment of the present disclosure.

FIG. 6 is a schematic block diagram of a network device 600 according to an embodiment of the present disclosure. As shown in FIG. 6, the network device 600 includes: a determining module 610 and a sending module 620.

The determining module 610 is configured to determine information about at least one second terminal device, where the information about the at least one second terminal device is used by a first terminal device to determine a to-be-used target resource.

The sending module 620 is configured to send the information about the at least one second terminal device that is determined by the determining module 610 to the first terminal device.

Optionally, the information about the at least one second terminal device includes at least one of the following:

information about the target resource used by each of the at least one second terminal device, interference capability information of each second terminal device, and location information of each second terminal device.

Optionally, the information about the target resource used by each second terminal device includes resource block occupation information of the target resource used by each second terminal device and information about a maximum transmit power available for each second terminal device to perform transmission by using the target resource; or the interference capability information of each second terminal device includes: maximum interference tolerable by each second terminal device.

Optionally, the determining module 610 is specifically configured to:

determine tolerable interference capability information of the second terminal device according to the location information of the second terminal device, minimum communication requirement information of the second terminal device, and resource usage information of the second terminal device, where the information about the second terminal device includes the tolerable interference capability information.

In this embodiment of the present disclosure, the network device determines the information about the at least one second terminal device, where the information about the at least one second terminal device is used by the first terminal device to determine the to-be-used target resource, so that communication resources can be flexibly allocated, thereby improving spectrum resource utilization.

The network device 600 according to this embodiment of the present disclosure may perform the communication method 400 for a terminal device in device to device (D2D) according to the embodiments of the present disclosure and various embodiments thereof, and the foregoing and other operations and/or functions of the modules in the device 600 respectively implement corresponding procedures of the foregoing methods. For brevity, details are not described herein again.

Figure 7:
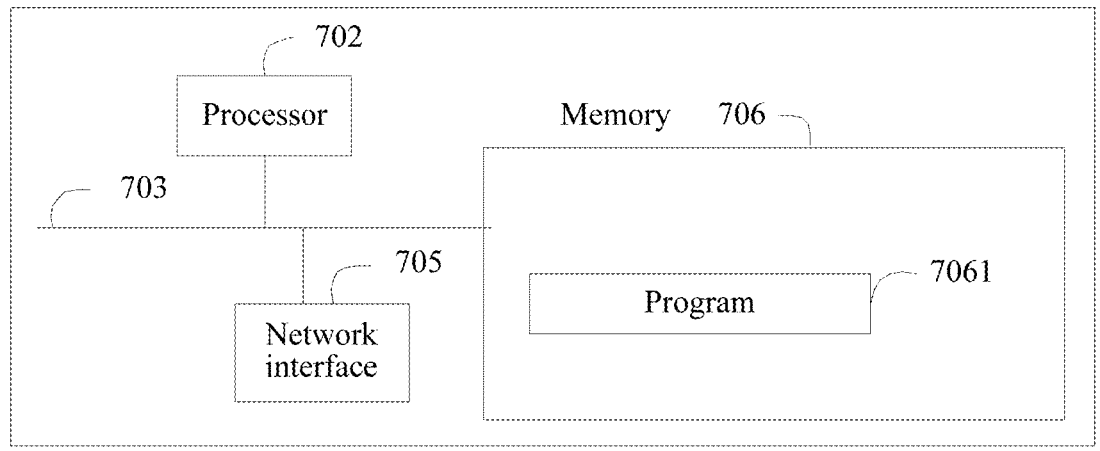
FIG. 7 is a structural diagram of a terminal device according to another embodiment of the present disclosure.

FIG. 7 shows a structure of a terminal device according to another embodiment of the present disclosure. The terminal device includes at least one processor 702 (such as a CPU), at least one network interface 705 or other communication interface, a memory 706, and at least one communication bus 703 configured to implement connection and communication between these apparatuses. The processor 702 is configured to execute an executable module, such as a computer program, stored in the memory 706. The memory 706 may include a high-speed random access memory (RAM, Random Access Memory), or may further include a non-volatile memory, for example, at least one magnetic disk storage. A communication connection with at least one other network element is implemented by using the at least one network interface 705 (which may be wired or wireless).

In some implementations, the memory 706 stores a program 7061, and the processor 702 executes the program 7061 to perform the communication method for a terminal device in device to device (D2D) from the perspective of a terminal device according to the foregoing embodiments of the present disclosure. For brevity, details are not described herein again.

Figure 8:
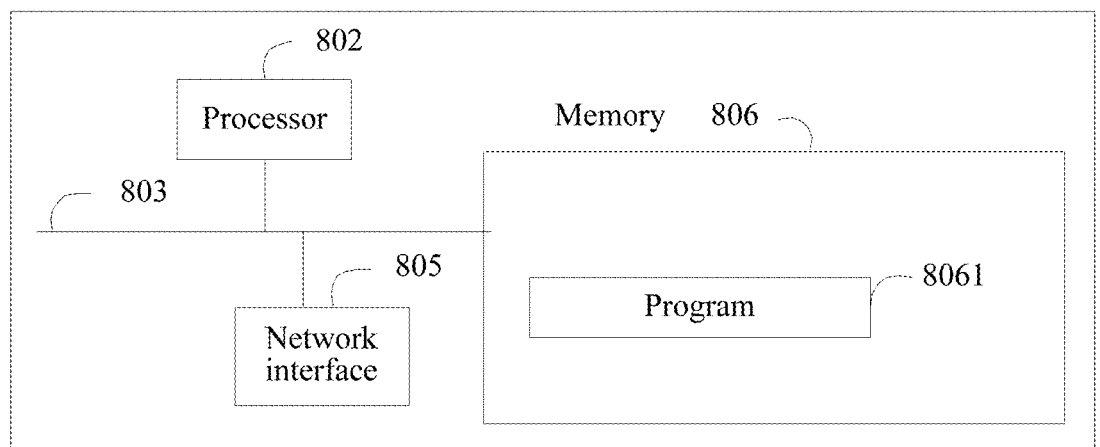
FIG. 8 is a structural diagram of a network device according to another embodiment of the present disclosure.

FIG. 8 shows a structure of a network device according to another embodiment of the present disclosure. The network device includes at least one processor 802 (such as a CPU), at least one network interface 805 or other communications interface, a memory 806, and at least one communication bus 803 configured to implement connection and communication between these apparatuses. The processor 802 is configured to execute an executable module, such as a computer program, stored in the memory 806. The memory 806 may include a high-speed random access memory (RAM, Random Access Memory), or may further include a non-volatile memory, for example, at least one magnetic disk storage. A communication connection with at least one another network element is implemented by using the at least one network interface 805 (which may be wired or wireless).

In some implementations, the memory 806 stores a program 8061, and the processor 802 executes the program 8061 to perform the communication method for a terminal device in device to device (D2D) from the perspective of a network device according to the foregoing embodiment of the present disclosure. For brevity, details are not described herein again.

It should be understood that, the term "and/or" in this specification describes only an association relationship between associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined according to functions and internal logic of the processes, and should not be construed as any limitation to the implementation processes of the embodiments of the present disclosure.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by using hardware or software depends on particular applications and design constraint conditions of the technical solutions. A person skilled in the art can use different methods to implement the described functions for each particular application, but it should not be considered that the implementation goes beyond the scope of the present disclosure.

It can be clearly understood by a person skilled in the art that, for the purpose of convenient and brief description, for a detailed working process of the foregoing system, apparatus, and unit, a corresponding process in the foregoing method embodiments may be referred to, and details are not described herein again.

In the several embodiments provided in this application, it should be understood that the disclosed system, apparatus, and method may be implemented in other manners. For example, the above-described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between the apparatuses or units through some interfaces, and may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objective of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method for device to device (D2D) communication, comprising:
   determining, by a first terminal device, information about at least one second terminal device that uses a target resource; and
   performing, by the first terminal device, the D2D communication according to the information about the at least one second terminal device by using the target resource;
   wherein the information about the at least one second terminal device comprises at least one of the following: information about the target resource used by the at least one second terminal device, interference capability information of the at least one second terminal device, and location information of the at least one second terminal device;
   wherein the performing, by the first terminal device, the D2D communication according to the information of the at least one second terminal device by using the target resource comprises:
      determining, by the first terminal device, a distance to the second terminal device according to the location information of the at least one second terminal device;
      determining, by the first terminal device, a maximum transmit power available for the first terminal device when using the target resource according to the distance to the at least one second terminal device and the interference capability information of the at least one second terminal device; and
      performing, by the first terminal device, communication according to the maximum transmit power by using the target resource;
   wherein the performing, by the first terminal device, communication according to the maximum transmit power by using the target resource comprises:
      when the maximum transmit power is greater than a minimum transmit power of the first terminal device that can satisfy a communication requirement, performing, by the first terminal device, the D2D communication by using the target resource;
   wherein the performing, by the first terminal device, communication by using the target resource comprises:
      determining, by the first terminal device, a transmit power P, wherein the transmit power P satisfies min $(P_{rest}, P_{max})>P>P_{min}$, wherein $P_{max}$ is the maximum transmit power of the first terminal device, $P_{min}$ is the minimum transmit power of the first terminal device that can satisfy a communication requirement, and $P_{rest}$ is a current remaining transmit power of the first terminal device; and
      performing, by the first terminal device, the D2D communication according to the transmit power P by using the target resource.

2. The method according to claim 1, wherein the information about the target resource used by the at least one second terminal device comprises: resource block occupation information of the target resource used by each second terminal device and information about a maximum transmit power available for each second terminal device to perform transmission by using the target resource; or
   the interference capability information of the at least one second terminal device comprises: a maximum interference tolerable by each second terminal device.

3. The method according to claim 1, wherein the at least one second terminal device comprises L second terminal devices, when the target resource is used by the L second terminal devices, $L \geq 1$ the performing, by the first terminal device, communication according to the maximum transmit power by using the target resource comprises:
   when a smallest value in the maximum transmit power and maximum transmit powers of the L second terminal devices is greater than a minimum transmit power of the first terminal device that can satisfy a communication requirement, performing, by the first terminal device, the D2D communication by using the target resource, wherein the L maximum transmit powers respectively indicate maximum transmit powers available for the L second terminal devices respectively when the target resource is used.

4. The method according to claim 3, wherein the performing, by the first terminal device, communication by using the target resource comprises:
   determining, by the first terminal device, a transmit power P, wherein the transmit power P satisfies min $(P_{rest}, P_{max}, P_{max1}, P_{max2}, \ldots, P_{maxL})>P>P_{min}$, wherein $P_{max}$ is the maximum transmit power, $P_{min}$ is the minimum transmit power, $P_{max1}, P_{max2}, \ldots, P_{maxL}$ respectively indicate the maximum transmit powers of the first to $L^{th}$ second terminal devices, and $P_{rest}$ is a current remaining transmit power of the first terminal device; and
   performing, by the first terminal device, D the 2D communication according to the transmit power P by using the target resource.

5. The method according to claim 1, wherein the method further comprises:
   after performing the D2D communication by using the target resource, updating, by the first terminal device, the current remaining transmit power $P_{rest}$ of the first terminal device according to the transmit power.

6. The method according to claim 5, wherein the updating the current remaining transmit power $P_{rest}$ of the first terminal device according to the transmit power comprises:
   determining, by the first terminal device, the current remaining transmit power of the first terminal device according to the following update formula:

$$P_{rest}=P'_{rest}-P$$

wherein the update formula indicates that after the first terminal device performs communication by using the target resource, the transmit power P is subtracted from a current remaining transmit power $P'_{rest}$.

7. The method according to claim 1, wherein the method further comprises:
   when $P_{rest}<P_{min}$, stopping, by the first terminal device, using the target resource for communication.

8. The method according to claim 1, wherein the determining, by the first terminal device, information about at least one second terminal device that uses the target resource comprises:

receiving, by the first terminal device, the information about the at least one second terminal device that is sent by a network device; or receiving, by the first terminal device, the information about the at least one second terminal device that is sent by the at least one second terminal device.

9. A terminal device, comprising:

a processor; and a memory for storing instructions executable by the processor;

wherein the processor is configured to perform a communication method for device to device (D2D) communication via execution of the instructions, the method including:

determining information about at least one second terminal device that uses a target resource; and performing the D2D communication according to the information about the at least one second terminal device by using the target resource;

wherein the information about the at least one second terminal device comprises at least one of the following: information about the target resource used by the at least one second terminal device, interference capability information of the at least one second terminal device, and location information of the at least one second terminal device;

wherein the processor is further configured to:

determine a distance to the second terminal device according to the location information of the at least one second terminal device;

determine a maximum transmit power available for the terminal device when using the target resource according to the distance to the at least one second terminal device and the interference capability information of the at least one second terminal device; and perform communication according to the maximum transmit power by using the target resource;

when the maximum transmit power is greater than a minimum transmit power of the terminal device that can satisfy a communication requirement, perform the D2D communication by using the target resource, determine a transmit power P, wherein the transmit power P satisfies $\min(P_{rest}, P_{max}) > P > P_{min}$, wherein $P_{max}$ is the maximum transmit power of the terminal device $P_{min}$ is the minimum transmit power of the terminal device that can satisfy a communication requirement, and $P_{rest}$ is a current remaining transmit power of the terminal device; and perform the D2D communication according to the transmit power P by using the target resource.

10. The method according to claim 4, wherein the method further comprises:

after performing the D2D communication by using the target resource, updating, by the first terminal device, the current remaining transmit power $P_{rest}$ of the first terminal device according to the transmit power.

11. The method according to claim 10, wherein the updating the current remaining transmit power $P_{rest}$ of the first terminal device according to the transmit power comprises:

determining, by the first terminal device, the current remaining transmit power of the first terminal device according to the following update formula:

$P_{rest} = P'_{rest} - P$ wherein the update formula indicates that after the first terminal device performs communication by using the target resource, the transmit power P is subtracted from a current remaining transmit power $P'_{rest}$.

12. The method according to claim 4, wherein the method further comprises:

when $P_{rest} < P_{min}$, stopping, by the first terminal device, using the target resource for communication.

* * * * *